United States Patent [19]
Sato et al.

[11] 3,812,216
[45] May 21, 1974

[54] SYNTHETIC RUBBER COMPOSITION
[75] Inventors: Hisatake Sato; Hideo Hayashi, both of Yokohama, Japan
[73] Assignee: Nippon Oil Company, Limited, Tokyo, Japan
[22] Filed: Oct. 5, 1971
[21] Appl. No.: 186,769

[30] Foreign Application Priority Data
Oct. 20, 1970 Japan.................. 45-91653

[52] U.S. Cl................. 260/887, 260/23.3, 260/845, 260/890, 260/892
[51] Int. Cl. ................... C08d 9/08, C08f 41/12
[58] Field of Search ........ 260/887, 890, 62, 82, 892

[56] References Cited
UNITED STATES PATENTS
2,965,612   12/1960   Holland et al. ............... 260/62
3,554,940   1/1971   Arakawa et al. .............. 260/887

Primary Examiner—Murray Tillman
Assistant Examiner—J. Ziegler
Attorney, Agent, or Firm—Ostrolenk Faber Gerb & Soffen

[57]                ABSTRACT

A synthetic rubber composition of excellent tackiness which comprises 100 parts by weight of a synthetic rubber and from 3 to 30 parts by weight of phenol modified resin obtained by polymerization of 100 parts by weight of hydrocarbon mixture, boiling within the range of 140° to 280° C, containing unsaturated hydrocarbons by-produced in cracking of petroleum and from 3 to 15 parts by weight of a phenolic compound, using from 0.05 to 5 parts by weight of boron trifluoride, its complex compound or aluminum chloride as catalyst.

6 Claims, No Drawings

SYNTHETIC RUBBER COMPOSITION

This invention relates to a synthetic rubber composition characterized by containing a thermoplastic resin obtained by polymerization an admixture of phenol and a fraction containing unsaturated hydrocarbons boiling within the range of 140° to 280° C available as by-product in the cracking of petroleum in order to improve tackiness of a synthetic rubber.

Synthetic rubbers such as styrene-butadiene rubber, alfin rubber, isobutylene-isoprene rubber, butadiene rubber, chloroprene rubber, and acrylonitrile-butadiene rubber are poor in tackiness compared to natural rubber. Therefore, therefore, tackifiers are generally employed to improve the roll processing properties thereof and to increase the adhesiveness of the bonding surfaces in manufacturing laminated products.

Heretofore known tackifiers for such purpose include alkylphenol resins such as alkylphenol-acetylene condensate, alkphenol-formaldehyde condensation product, alkylphenol-sulfide resins, xylene resins, coumarone-indene resins, petroleum resin and like.

Among these tackifiers, alkylphenol resins and xylene resins have relatively good tackifying effect but have the disadvantage of very high price. Coumarone-indene resins are relatively low in price but their tackifying effect is much lower than that of the two resins aforementioned. Petroleum resins are also very low in tackifying effect similar to coumarone-indene resins.

In the event that a tackifier is used to improve tackiness of the synthetic rubber, it is important to increase the tack strength without lowering other physical properties of the resultant synthetic rubber composition. Also when the rubber composition is to be vulcanized, it is important that the vulcanization time should not be unduly prolonged by the addition of the tackifier.

A rubber composition comprising of a novel thermoplastic resin and a synthetic rubber according to this invention has excellent tackiness and is free from the above-described disadvantages of synthetic rubber tackified with conventional tackifiers. Furthermore, the synthetic rubber composition of this invention can be prepared at low cost commercially. Compositions of this invention are also effective as an adhesive for bonding paper, wood and other natural substances as well as synthetic high polymers.

Raw materials for the preparation of the tackifiers of this invention are a cracked oil fraction boiling within the range of 140° – 280° C or a combination in suitable proportions of a subfraction fractionated within such boiling range of a by-product hydrocarbon oil obtained in the cracking of petroleum and like, for example thermal cracking such as steam cracking, vapor-phase thermal cracking, sand cracking or catalytic cracking etc. for the production of ethylene, propylene, butenes, butadienes etc., using light or heavy naphtha, kerosene or light oil, heavy or crude oil etc.

The fraction having a boiling range of 140° – 280° C thus prepared contains styrene, indene and indene derivatives in large amounts. When the fraction below 140° C is used, the softening point of resin thus obtained will be lowered and physical properties such as tensile stress, tensile strength etc. will also be lowered compared to a composition synthesized employing the resin aforementioned.

As for phenol and like, phenol, cresol, xylenol, tert-butylphenol, nonylphenol and like can be used independently or as a mixture of two or more kinds thereof. Suitable amounts to be added are 3 to 5 parts per cracked oil fraction.

The resin obtained with less than three parts of phenol added to cracked oil fraction will not exhibit excellent tackiness when incorporated with synthetic rubber as noted in comparative example described hereafter. Also resin prepared with fifteen or more parts of phenol likely shows the tendency to retard the vulcanizing time when incorporated into synthetic rubber. As catalyst, ordinary Friedel-Craft type catalyst, especially boron trifluoride complex compound or aluminum chloride is used in the amount of 0.05 – 5 wt. percent per raw material oil used.

Production of resins of this invention is described hereinbelow.

A fraction of cracked oil and the phenol are introduced into a reactor in said fixed proportion and stirred adding the catalyst at temperatures of 0° – 80° C and reacted for the period of 1 – 5 hours. After the reaction is terminated, the resin is obtained by decomposing the catalyst with an acid or alkali, washing with water and removing unreacted oils and low polymers by evaporation or distillation.

The hydrocarbon resin thus obtained has a softening point of 50° – 120° C (measured by JISK–2531–60), and color of 3 – 4 (Gardner color scale, ASTMD–15-44–58T measured with a solution of 2 g. of sample in 25 ml. of benzene).

The tackifier used in this invention is characterized by modification of the hydrocarbon resin with phenol in the way aforementioned. The hydrocarbon resin thus obtained by the addition of phenol and like exhibits excellent tackifying ability when incorporated in various synthetic rubbers.

This invention relates to a synthetic rubber composition having improved tackiness comprising of a synthetic rubber and the hydrocarbon resin mentioned above. Also, the composition of this invention may further contain conventional tackifiers.

For the preparation of the composition of this invention, a synthetic rubber and the tackifier described above are compounded by mixing. For the purpose of increasing tack strength of the bonding surfaces in the processing of synthetic rubber, it is preferred to use 3 – 30 parts of the tackifier per 100 parts of the synthetic rubber. Under 3 parts, improvement of tackiness is insufficient and over 30 parts physical properties of synthetic rubber may be lowered. Also, more parts may be used for bonding paper, wood, synthetic high polymer and like.

The synthetic rubber composition of this invention not only exhibits the surprising feature of extremely high tack strength, but also has advantages of favorable influences of not spoiling physical properties of the synthetic rubber and not retarding vulcanization time, etc.

Inasmuch as main raw material for this tackifier is produced in large quantities in petrochemical industry, the tackifier of this invention can be prepared in controlled quality at low cost which could be one of its excellent characteristic features.

As to the preparation methods of coumarone-indene resin modified by phenol or petroleum resins, there are Japanese Pat. publications such as Nos. 39–24275 and 45–8163. 39–24275 is applied for the purpose of producing alcohol soluble coumarone-indene resin and the latter is for resins to be used for sizing agents. Therefore, it is entirely different from the purpose of this invention which is in manufacturing the resins to be incorporated in synthetic rubber and accordingly the properties required to the resins suitable to this purpose have the following substantial differences.

Primarily, as Japanese Pat. publication No. 39-24275 is aimed for alcohol soluble resin, the upper limit of the amounts of phenol to be used is not limited due to the reason that the resin with better solubility can be obtained when added amounts of phenol and like are increased. In contrast, in case of resin for synthetic rubber incorporation of this invention, if phenol addition is increased, some undesirable properties such as retarding vulcanization velocity at the time of vulcanization of the synthetic rubber are likely to appeared. Therefore, the upper limit of amounts of phenol to be used is specified.

Secondarily, as Japanese Pat. publication No. 45-8163 is aimed for the production of resins for sizing agents, resins with an acid value of 100 to 170 are described, whereas the resins of this invention have an acid value of about 40-80 and is obtained by copolymerization of feed oil and phenol and like added in proportion of 3-15 parts per feed oil, and having exhibit excellent effect when incorporated into the synthetic rubber. This invention is characterized in that the superior synthetic rubber composition is obtainable by incorporating resins prepared by the use of particular proportions of phenol and like.

Lastly, for the purpose of illustrating this invention, examples are set forth below without intending to limit this invention thereto.

EXAMPLE 1

A fraction having the boiling range of 140° – 180° C taken from a cracked oil fraction obtained from the steam cracking of naphtha had a polymerizable component content of 55 percent. This fraction, as raw material, to which phenol and like were added in ratio of five parts per raw material, was polymerized at 30° C for 3 hours, using 0.5 percent by weight of boron trifloride ethyl ether complex compound catalyst. After decomposing the catalyst with an aqueous solution of caustic soda, the resin was obtained by washing with water and removing unreacted oils by evaporation under vacuum. The kinds of phenol, yields and properties of the resins obtained are shown in Table 1. Data where phenol and like was not added are also shown for comparison.

TABLE 1

| No. | Kind of Phenol added | Yield | Resin Properties Soft. Pt. | Acid Value | Color |
|---|---|---|---|---|---|
| 1 | phenol | 34% | 85°C | 59 | 4 |
| 2 | cresol* | 35 | 80 | 50 | 4 |
| 3 | P-Tert-butylphenol | 42 | 99 | 49 | 4 |

Table 1 – Continued

| 4 | nonylphenol | 40 | 99 | 45 | 3 |
|---|---|---|---|---|---|
| For comparison | none | 42 | 110 | 0 | 3 |

*Gas chromatographic analysis of cresol;
phenol 30%
o-cresol 10
m-cresol 25
p-cresol 15
Xylenol 10

Each of these resins, commercial alkylphenol-formaldehyde resin and commercial coumarone-indene resin was mixed as tackifier with styrene-butadiene rubber in the proportion shown in table 2 and tests were conducted on tackiness, Mooney scorch and vulcanization.

TABLE 2

| | |
|---|---|
| Styrene-butadiene rubber (JSR No. 1500) | 100 parts by weight |
| Zinc oxide | 5 " |
| Stearic acid | 2 " |
| Sulfur | 2 " |
| Accelerator DM | 1.5 " |
| Accelerator TT | 0.2 " |
| Carbon black HAF (Ceased H) | 50 " |
| Process oil (Surcolite process oil) | 4 " |
| Tackifier | 5 " |

In compounding, all ingredients other than tackifiers were roll-mixed maintaining the surface temperature of the rolls at 50° ± 5° C and then each tackifier was roll-mixed therein maintaining the surface temperature of the rolls at temperatures of 5° C above the softening point of the respective tackifier. The rolls had a diameter of 200 mm. and a width of 450 mm. and front roll was run at 18 rpm with revolution ratio of 1 : 18. Each of above sample compounds was then made into a sheet of about 3 mm. thickness by rolling at a surface temperature of the rolls of 55° – 60° C for 3 minutes. These specimens were left at 21° C for about 3 hours and then the tack strength was measured by Pickup Tackmeter, using press conditions of 10 seconds under 500 g load. Results of the tests are shown in Table 3. Samples from No. 1 to No. 4 are compositions of this invention.

TABLE 3

| Tackifier | None | No. 1 | No. 2 | No. 3 | No. 4 | Comparative example (no phenol) | Commercial alkylphenol resin | Commercial coumarone-indene resin |
|---|---|---|---|---|---|---|---|---|
| Tackiness value | 380 | 850 | 760 | 830 | 800 | 400 | 810 | 340 |
| Index* | 100 | 224 | 200 | 218 | 210 | 105 | 213 | 89 |

*Index in the Table is the ratio of tack strength of the rubber compound containing no tackifier.

As will be seen from the above Table, compositions containing styrene-butadiene rubber and tackifier of this invention have much superior tackiness compared with compositions containing coumarone-indene resin and almost even or higher compared with the composition containing alkylphenol resin. Also composition containing resin without phenol and like added has very much inferior tackiness as compared with resin with the phenolic added.

Mooney scorch test was conducted on these specimens according to the method of JISK 6300-1063. Test results are shown in Table 4. A L type rotor was employed in the test and test temperature was 120° C with preheating time of 1 minute.

TABLE 4

| Kind of tackifier | None | No. 1 | No. 2 | No. 3 | No. 4 | Comparative example (no phenol) | Commercial alkylphenol resin | Commercial coumarone-indene resin |
|---|---|---|---|---|---|---|---|---|
| Mooney viscosity $ML_{1+4}$ (120°C) | 63 | 56 | 57 | 57 | 57 | 57 | 56 | 56 |
| Maximum mooney viscosity | 69 | 62 | 63 | 63 | 63 | 63 | 61 | 62 |
| Mooney scorch time: | | | | | | | | |
| t5 | 14'04" | 16'24" | 16'11" | 15'23" | 15'20" | 15'38" | 12'18" | 15'42" |
| t35 | 19'29" | 21'54" | 21'32" | 20'54" | 21'42" | 20'58" | 17'26" | 22'31" |
| tΔ30 | 5'25" | 5'30" | 5'11" | 5'31" | 6'22" | 5'20" | 5'18" | 6'49" |

As will be seen from the above Table 4, there is no substantial difference between the compositions containing styrene-butadiene rubber with tackifier of this invention and the composition containing tackifier in the Mooney scorch time, thus indicating there will be no major difference in vulcanization time between the two.

The samples were then vulcanized at 150° C for 20 and 40 minutes according to the method of ASTMD-15-64T, and physical properties of the vulcanizates were tested according to the method of JISK 6301-1963. The following test conditions were employed. Tensile test: Schopper tensile machine (capacity 50 kg)

Stretching rate – 500 mm/min
Test piece in Dumbbell No. 3 type Hardness test:
Spring type hardmeter Room temperature: 25° C
Results obtained are shown in the following Table 5.

TABLE 5

| | Vulcanization time (min.) | Tackifier | | | | | Commercial alkylphenol resin |
|---|---|---|---|---|---|---|---|
| | | None | No. 1 | No. 2 | No. 3 | No. 4 | |
| 300% modulus, kg/cm² | 20 | 165 | 126 | 130 | 147 | 140 | 115 |
| | 40 | 214 | 168 | 172 | 181 | 181 | 156 |
| Tensile strength, kg/cm² | 20 | 255 | 297 | 301 | 302 | 297 | 290 |
| | 40 | 295 | 291 | 297 | 299 | 296 | 294 |
| Elongation, percent | 20 | 440 | 560 | 580 | 520 | 540 | 590 |
| | 40 | 390 | 470 | 430 | 450 | 440 | 480 |
| Hardness, Hs | 20 | 64 | 62 | 63 | 62 | 62 | 61 |
| | 40 | 67 | 65 | 63 | 62 | 65 | 64 |

As will be seen from the above Table 5, there is no substantial difference between the compositions containing styrene-butadiene rubber compounds with tackifier of this invention and the composition containing tackifier in vulcanization velocity and in physical properties of the vulcanizates. Also, the composition tackified by this invention proved to be much superior when compared with the composition containing alkylphenol resin.

EXAMPLE 2

A fraction having the boiling range of 170° – 220° C take from the cracked oil fraction obtained from the steam cracking of naphtha contained a polymerizable component of 65 percent by weight. This fraction, as a raw material to which nine parts of the phenalic were added, was polymerized under conditions identical to Example No. 1 and the resin was obtained with properties as shown below:

TABLE 6

| No. | Phenol added | Resin Properties | | | |
|---|---|---|---|---|---|
| | | Yield | Soft. Pt. | Acid Value | Color |
| 5 | Phenol | 45% | 60°C 78 | | 4 |
| 6 | Cresol* | 45 | 68 | 70 | 4 |
| 7 | P-tert-butylphenol | 50 | 70 | 52 | 4 |
| 8 | Nonylphenol | 46 | 78 | 56 | 3 |

*As to the composition, refer to Table 1.

Alfin rubber was roll-mixed with these resins and commercial alkylphenol-formaldehyde resin as tackifiers following the recipe of Table 7 and the tack strength and vulcanization tests were conducted on these compounds. Test results are shown in Table 8 and Table 9. Samples from No. 5 to No. 8 were compositions of this invention. Roll-mixing was conducted maintaining the surface temperature of rolls at 100 ± 5° C and the procedure used for compounding and testing were identical as described in Example 1.

TABLE 7

| | |
|---|---|
| Alfin rubber (BD/ST = 85/15) | 100 parts by weight |
| Stearic acid | 2 " |
| Zinc oxide No. 1 | 2 " |
| Sulfur | 2.3 " |
| Accelerator C2 | 1.4 " |
| Carbon black HAF (ceased H) | 65 " |
| Process oil (Sandex 58) | 30 " |
| Tackifier | 5 " |

TABLE 8

| | Tackifier | | | | | Commercial alkylphenol resin |
|---|---|---|---|---|---|---|
| | None | No. 5 | No. 6 | No. 7 | No. 8 | |
| Tack strength value (g) | 240 | 440 | 440 | 400 | 880 | 470 |
| Index | 100 | 183 | 183 | 167 | 158 | 199 |

TABLE 9

| | Vulcanizing time (min.) | Tackifier | | | | Commercial alkylphenol resin |
|---|---|---|---|---|---|---|
| | | None | No. 5 | No. 6 | No. 7 | No. 8 | |
| 300% modulus, kg/cm² | 20 | 111 | 88 | 86 | 90 | 91 | 80 |
| | 40 | 116 | 97 | 96 | 96 | 96 | 83 |
| Tensile strength, kg/cm² | 20 | 220 | 212 | 210 | 208 | 208 | 207 |
| | 40 | 220 | 205 | 220 | 211 | 207 | 216 |
| Elongation (%) | 20 | 510 | 550 | 580 | 570 | 560 | 630 |
| | 40 | 500 | 530 | 570 | 550 | 550 | 600 |
| Hardness, Hs | 20 | 59 | 56 | 56 | 57 | 56 | 54 |
| | 40 | 60 | 58 | 59 | 57 | 58 | 56 |

As will be seen from Table 8, the tack strength of the tackifier of this invention is almost equal to that of commercial alkylphenol. Also, as will be seen from Table 9, the compositions containing the tackifier of this invention have better results in vulcanization tests compared with compositions containing commercial alkylphenol resins.

EXAMPLE 3

A fraction identical to the fraction used in Example 1 was polymerized with seven parts of the phenolic added using boron trifluoride gas or aluminum chloride as catalyst under the conditions of 50° C and 1 hour, and thereafter the reaction product was treated in the same way as described in Example 1. The properties of the resulting resins are shown in Table 10.

TABLE 10

| No. | Phenol added | Catalyst | | Resin properties | | | |
|---|---|---|---|---|---|---|---|
| | | Kind | Percent | Yield | Soft. pt. | Acid value | Color |
| 9 | Phenol | BF₃ gas | 0.3 | 40 | 80 | 60 | 4 |
| 10 | Cresol* | AlCl₃ | 1.0 | 43 | 83 | 60 | 4 |
| 11 | Nonylphenol | AlCl₃ | 1.0 | 40 | 85 | 55 | 4 |

* As to the composition, refer to Table 1.

A blend of styrene-butadiene rubber and butylene rubber was roll-mixed with these resins, commercial alkylphenol formaldehyde resin and commercial coumarone-indene resin, following the recipe of Table 11, and the tack strength test was conducted.

TABLE 11

| | |
|---|---|
| Styrene-butadiene rubber (JSR No. 1500) | 70 parts by weight |
| Butylene rubber (JSR BR-01) | 30 " |
| Zinc oxide No. 1 | 5 " |
| Stearic acid | 2 " |
| Sulfur | 2 " |
| Accelerator DM | 1.5 " |
| Accelerator TT | 0.2 " |
| Carbon black HAF | 50 " |
| Process oil (Surcolite process acid) | 4 " |

The roll-mixing and the tack strength test were conducted in the same way as in Example 1. The results of the tack strength test are shown in Table 12.

TABLE 12

| | Tackifier | | | | Commercial alkylphenol resin | Commercial coumarone-indene resin |
|---|---|---|---|---|---|---|
| | None | No. 9 | No. 10 | No. 11 | | |
| Tack strength | 60 | 180 | 220 | 210 | 220 | 150 |
| Index | 100 | 300 | 367 | 350 | 367 | 250 |

As will be seen from Table 12, the composition containing the tackifier of this invention and the blended styrene-butadiene rubber and butylene rubber has superior tack strength compared with the compositions containing tackifier and the compositions containing coumarone-indene resins and also is about the same when compared with the compositions containing alkylphenol resins.

COMPARATIVE EXAMPLE 1

The fraction identical to the fraction used in Example 1 was polymerized with a phenal in the proportion of two parts per the relevant fraction, using 0.5 weight percent of boron trifluoride ethylether complex compound as the catalyst under the conditions of 50° C and 2 hours. After the reaction was terminated, the resin was obtained by decomposing the catalyst with an aqueous solution of caustic soda, washing with water are removing unreacted oils by vacuum distillation. The phenol used and yields and properties of the resins obtained are shown in Table 13.

TABLE 13

| No. | Phenols added | Resin Properties | | | |
|---|---|---|---|---|---|
| | | Yield | Soft. Pt. | Acid Value | Color |
| 12 | Phenol | 42 | 96 | 31 | 3 |
| 13 | p-Cresol | 40 | 95 | 26 | 3 |
| 14 | p-tert-butylphenol | 40 | 103 | 20 | 3 |
| 15 | Nonylphenol | 41 | 103 | 20 | 3 |

These resins were roll-mixed following the recipe of Example 1 and the tack strength tests were conducted on these compounds. The test results are shown in Table 14.

TABLE 14

| Tack strength | None | No. 12 | Tackifier No. 13 | No. 14 | No. 15 |
|---|---|---|---|---|---|
| | 350 | 470 | 480 | 430 | 460 |
| Index | 100 | 134 | 137 | 123 | 131 |

As will be seen from this table, the tack strength of these resins are so inferior as these can hardly show the effectiveness as tackifiers as compared with those of resins obtained in Example 1.

COMPARATIVE EXAMPLE 2

A fraction identical to the fraction used in Example 1 was polymerized with 20 parts of a phenol and using 0.5 percent by weight of boron trifluoride ethylether complex compounds as catalyst at 10° C for 5 hours. After the reaction was terminated, the resins were obtained by decomposing the catalyst with an aqueous solution of caustic soda, washing with water and removing unreacted oils in vacuum distillation. Table 15 shows the kinds of phenol added and yields and properties of the resins thus obtained.

TABLE 15

| No. | Phenols added | Yield | Resin Properties Soft. Pt. | Acid Value | Color |
|---|---|---|---|---|---|
| 16 | Phenol | 42 | 62 | 145 | 4 |
| 17 | p-Cresol | 43 | 60 | 133 | 5 |
| 18 | p-tert-butylphenol | 40 | 65 | 110 | 4 |
| 19 | Nonylphenol | 42 | 65 | 105 | 5 |

These resins were roll-mixed following the recipe of Example 1 and tack strength test and Mooney scorch test were conducted. The results obtained are shown in the following Table 16 and 17.

TABLE 16

| Tack strength | None | No. 16 | Tackifier No. 17 | No. 18 | No. 19 |
|---|---|---|---|---|---|
| | 380 | 850 | 800 | 800 | 780 |
| Index | 100 | 224 | 210 | 210 | 205 |

TABLE 17

| | Tackifier | | | | |
|---|---|---|---|---|---|
| | None | No. 16 | No. 17 | No. 18 | No. 19 |
| Mooney viscosity $ML_{1+4}$ | 63 | | | | |
| Mooney scorch time: | | | | | |
| $t5$ | 14'04" | 21'20" | 21'45" | 21'04" | 21'08" |
| $t35$ | 19'29" | 27'37" | 28'37" | 28'32" | 27'35" |
| $t\Delta35$ | 5'25" | 6'17" | 6'52" | 7'28" | 6'32" |

As will be seen from above Table 16 and 17, the tack strength when incorporated in rubber is equal to that of Example 1, however, the vulcanizing time is inclined to be retarded considerably.

What is claimed is:

1. A synthetic rubber composition of excellent tackiness which comprises 100 parts by weight of a butadiene rubber, and from 3 to 30 parts by weight of a tackifier, wherein said tackifier is a phenolic modified resin obtained by polymerizing at 0°–80° C. 100 parts of a cracked petroleum fraction boiling within the range of 140° to 280° C., and from 3 to 15 parts of a phenolic material selected from the group consisting of phenol, alkyl phenol and mixtures thereof in the presence of 0.05 to 5 parts by weight of a Friedel-Crafts catalyst.

2. The synthetic rubber composition of claim 1 wherein said phenolic material is a compound selected from the group consisting of phenol, cresol, xylenol, tertbutylphenol and nonylphenol.

3. The synthetic rubber composition of claim 1 wherein said Friedel-Crafts catalyst is boron trifluoride, a boron trifluoride complex or aluminum chloride.

4. The synthetic rubber composition of claim 1 wherein said tackifier has a softening point of 50° to 120° C., and a Gardner color of 3–4.

5. The synthetic rubber composition of claim 1 wherein the synthetic rubber is styrene-butadiene rubber and said composition contains 5 parts tackifier.

6. The synthetic rubber composition of claim 1 wherein said synthetic rubber is alfin rubber and said composition contains 5 parts tackifier.

* * * * *